United States Patent
Albrechts

(10) Patent No.: US 8,978,328 B2
(45) Date of Patent: Mar. 17, 2015

(54) PROTECTIVE FOOT FOR A UNIT LOAD, IN PARTICULAR CONCRETE TOWER SEGMENTS

(75) Inventor: Harald Albrechts, Moorhusen (DE)

(73) Assignee: Wobben Properties GmbH, Aurich (DE)

(*) Notice: Subject to any disclaimer, the term of this patent is extended or adjusted under 35 U.S.C. 154(b) by 0 days.

(21) Appl. No.: 13/811,621

(22) PCT Filed: Jul. 25, 2011

(86) PCT No.: PCT/EP2011/062703
§ 371 (c)(1),
(2), (4) Date: Apr. 26, 2013

(87) PCT Pub. No.: WO2012/010710
PCT Pub. Date: Jan. 26, 2012

(65) Prior Publication Data
US 2013/0213983 A1    Aug. 22, 2013

(30) Foreign Application Priority Data
Jul. 23, 2010    (DE) .................... 10 2010 038 311

(51) Int. Cl.
E02D 5/54    (2006.01)
E02D 5/72    (2006.01)
E02D 27/42    (2006.01)

(52) U.S. Cl.
USPC ............. 52/297; 52/169.13; 52/165; 52/294

(58) Field of Classification Search
CPC ......... E02D 27/42; E02D 27/12; E02D 27/16; E02D 27/30; E02D 27/50; E02D 5/72
USPC ........... 52/167.1, 167.9, 167.13, 170, 169.13, 52/169.7, 292, 295, 296, 297, 298, 299, 52/300, 301
See application file for complete search history.

(56) References Cited

U.S. PATENT DOCUMENTS

| | | | | |
|---|---|---|---|---|
| 337,882 A * | 3/1886 | Stanton | ............................ | 52/297 |
| 1,284,565 A * | 11/1918 | Bennett | ............................ | 52/297 |
| 1,474,458 A * | 11/1923 | Wilkison | ........................ | 52/161 |
| 1,567,301 A * | 12/1925 | Ross | .................................. | 52/40 |
| 1,735,722 A * | 11/1929 | Beard | ............................ | 52/168 |
| 1,940,430 A * | 12/1933 | Morterra | ........................ | 52/160 |
| 2,622,546 A * | 12/1952 | Kramrisch | ..................... | 52/643 |
| 3,144,106 A * | 8/1964 | Jacobson | ........................ | 52/160 |
| 3,381,427 A * | 5/1968 | Watson | ............................. | 52/98 |
| 3,420,013 A * | 1/1969 | Alvarado | ........................ | 52/161 |
| 3,653,169 A * | 4/1972 | Jenner | ............................ | 52/298 |
| 3,691,776 A * | 9/1972 | Hull | ............................. | 405/232 |
| 4,572,069 A * | 2/1986 | Schwarzbeck | .................. | 101/76 |
| 4,662,139 A * | 5/1987 | Bollmann | ........................ | 52/296 |

(Continued)

FOREIGN PATENT DOCUMENTS

| | | |
|---|---|---|
| CN | 2924013 Y | 7/2007 |
| CN | 100529275 C | 8/2009 |
| DE | 0154785 | 4/1982 |
| EP | 2159412 A1 | 3/2010 |
| JP | 62-75464 U | 5/1987 |
| JP | 63-184208 A | 7/1988 |
| JP | 05033492 A * | 2/1993 |
| JP | 5-501904 A | 4/1993 |
| JP | 2002-30659 A | 1/2002 |
| JP | 2002-59776 A | 2/2002 |
| JP | 2004-225509 A | 8/2004 |
| WO | 91/01929 A1 | 2/1991 |
| WO | 2007/093854 A2 | 8/2007 |
| WO | 2009/121581 A2 | 10/2009 |
| WO | 2009/141018 A2 | 11/2009 |

Primary Examiner — Jeanette E. Chapman
(74) Attorney, Agent, or Firm — Seed IP Law Group PLLC

(57) ABSTRACT

A protective foot is provided for a piece goods item, in particular a pylon section segment or a concrete pylon segment of a wind power installation. The protective foot has a bottom plate for receiving an end of the item and a fixing unit for releasable fixing to the end of the item.

11 Claims, 3 Drawing Sheets

(56) References Cited

U.S. PATENT DOCUMENTS

| | | | | |
|---|---|---|---|---|
| 4,793,110 A | * | 12/1988 | Tucker | 52/297 |
| 4,972,642 A | * | 11/1990 | Strobl, Jr. | 52/297 |
| 5,108,068 A | * | 4/1992 | Gingras | 248/545 |
| 5,775,848 A | * | 7/1998 | Blankinship et al. | 405/244 |
| 7,055,807 B2 | * | 6/2006 | Pesta | 256/65.14 |
| 7,722,014 B2 | * | 5/2010 | Godwin | 256/65.14 |
| 8,037,646 B2 | * | 10/2011 | Wobben | 52/126.3 |
| 8,443,557 B2 | * | 5/2013 | Gevers et al. | 52/170 |
| 8,770,527 B2 | * | 7/2014 | Leary et al. | 248/219.2 |
| 2002/0166302 A1 | * | 11/2002 | Ogorchock | 52/294 |

\* cited by examiner

PROTECTIVE FOOT FOR A UNIT LOAD, IN PARTICULAR CONCRETE TOWER SEGMENTS

BACKGROUND

1. Technical Field

The present disclosure concerns a protective foot for a unit load or piece goods item, in particular concrete pylon segments.

2. Description of the Related Art

Conventionally an item of piece goods, such as, for example, a pylon section segment or a (concrete) pylon segment is protected from damage by the surface beneath it by wood blocks which are placed beneath it. To avoid horizontal movement, a rubber mat can be placed between the item and the wood block and between the wood block and the underneath surface. As an alternative thereto, for example, upon transport on a freight ship, it is also possible to weld steel feet and/or stopper plates on the transport surface, which are intended to prevent the item from moving horizontally.

When using wood blocks and rubber mats there is the risk of slipping during transport, whereby an item no longer enjoys adequate protection. The use of steel feet for avoiding horizontal movement involves the risk of damaging the item of piece goods. Continuously working with wood blocks and rubber mats entails a considerable level of complication and expenditure. Upon unloading, they first remain lying around and subsequently have to be collected up for further use while the piece goods item after unloading has to be protected by fresh wood blocks and rubber mats. It can also happen that they can no longer be found due to negligent handling (they are forgotten or thrown away) and thus cannot be re-used. On top of everything, that kind of safeguarding piece goods is linked to dangers to the person implementing such procedures.

As general state of the art, attention is directed to DD 154 785 A3.

BRIEF SUMMARY

Embodiments of the present invention provide a protective foot for a piece goods item, in particular a pylon section segment, for use during transport and storage.

The protective foot has a (substantially horizontal) portion of predetermined length (hereinafter referred to as the bottom plate) and at least one fixing portion for releasably fitting the foot to the piece goods item.

Embodiments of the invention concern the notion of providing a protective foot which is connected securely but releasably to the piece goods item. That considerably reduces the complication and expenditure for safeguarding the item during transport and intermediate storage. The working steps which are usually involved in loading operations for protecting a piece goods item can be omitted for the most part, which saves on time and thus cost. Equally the danger to the transport personnel is considerably reduced by virtue of elimination of securing steps during transport.

If such a foot can additionally be easily arrested and demounted (dismantled), it can be employed again for further uses, thereby saving resources and reducing cost. That is additionally promoted by the foot being of a compact configuration as return transport or further transport is not made unnecessarily more difficult.

Reusability is further promoted by employing polyurethane as the production material. In this way, the foot can be repaired by filling. That means that a damaged foot is not disposed of but is repaired and put to further use.

Protection for the piece goods item from horizontal damage in the transport procedure is achieved by fitting side portions to the bottom plate. In addition, side portions projecting perpendicularly from the bottom plate can serve as a contact surface for stopper plates for safeguarding a load against horizontal movement.

A drainage channel makes it possible to carry away water, which has penetrated into the foot, which could otherwise collect and could cause damage due to deformation, for example, in the event of frost.

To protect a piece goods item from slipping on the transport surface, a rubber coating or an anti-slip unit (anti-slip mat) can be glued to the underside of the foot. As a further improvement and to provide protection from slipping both of the item on the foot and also of the entire load on the transport surface, the entire foot can be provided with a rubber coating. That is important insofar as the foot cannot carry shearing forces which occur upon horizontal movement of a heavy item. Experience has shown that rubber-coating provides for a sufficient braking effect. Permanent rubber-coating makes it unnecessary to place separate rubber mats beneath the foot.

Further embodiments and configurations of the invention are subject-matter of the appendant claims.

BRIEF DESCRIPTION OF THE SEVERAL VIEWS OF THE DRAWINGS

Advantages and embodiments by way of example of the invention are described in greater detail hereinafter with reference to the drawings.

DETAILED DESCRIPTION

Figure 1:
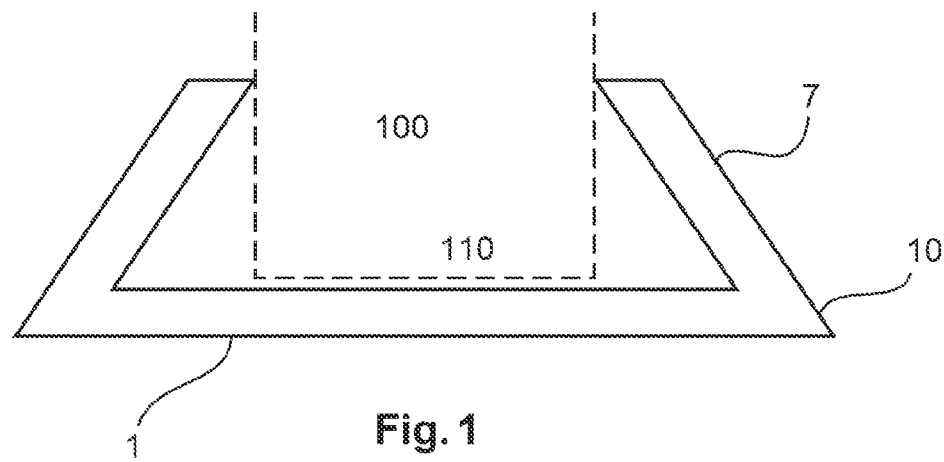
FIG. 1 shows a diagrammatic sectional view of a protective foot according to a first embodiment.

FIG. 1 shows a sectional view of a protective foot in accordance with a first embodiment. The protective foot has a bottom plate 1 and side portions 7. For a piece goods item 100, such as, for example, a pylon section segment of a wind power installation, the foot 10 as shown in FIG. 1 can be fixed to the item or to the first end 110 thereof. That can be effected by inwardly inclined side portions 7 which are connected to the bottom plate 1 and which are stressed outwardly when the foot is fitted on in place and which press laterally against the item 100 after being released. The foot can be easily removed again by again stressing the side portions 7 outwardly.

Optionally a first anti-slip unit (e.g., anti-slip mat) can be provided on the underside of the bottom plate 1. In addition, optionally a second anti-slip unit (e.g., anti-slip mat) can be provided on a top side of the bottom plate 1.

Figure 2:
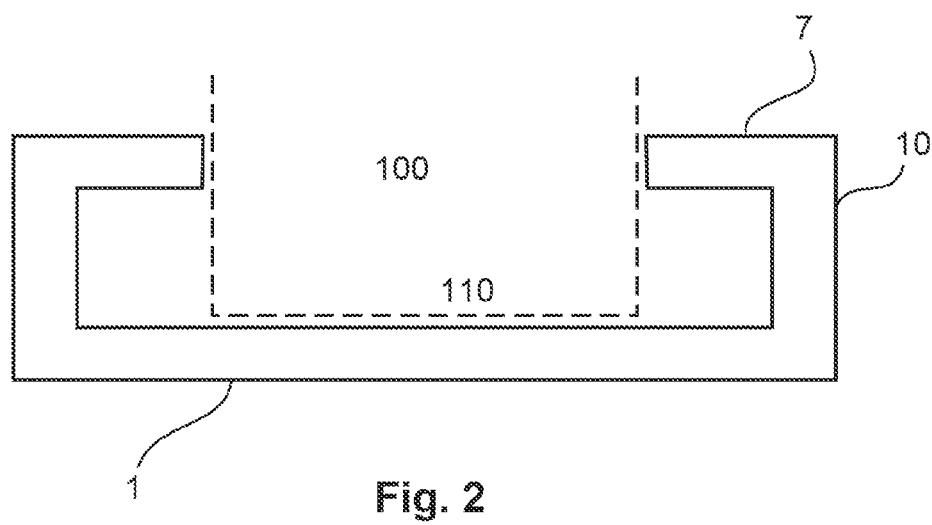
FIG. 2 shows a diagrammatic sectional view of a protective foot according to a second embodiment.

FIG. 2 shows a diagrammatic sectional view of a protective foot according to a second embodiment. The second embodiment represents an alternative to the first embodiment. The protective foot 10 has a bottom plate 1 and side portions 7. In this case, the side portions 7 are not inclined but project at a right angle from the bottom plate 1. Side portions 7 shaped in that way can serve at the same time for receiving stopper plates to safeguard against horizontal movements, for example, on freight ships.

Optionally a first anti-slip unit (e.g., anti-slip mat) can be provided on the underside of the bottom plate 1. In addition, optionally a second anti-slip unit (e.g., anti-slip mat) can be provided on a top side of the bottom plate 1.

Figure 3:
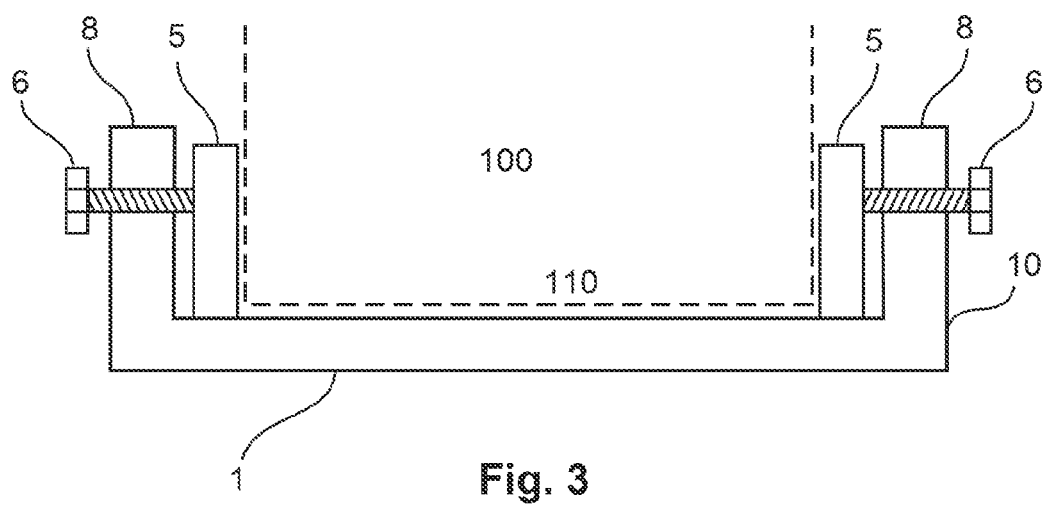
FIG. 3 shows a diagrammatic sectional view of a protective foot according to a third embodiment.

FIG. 3 shows a diagrammatic sectional view of a protective foot in accordance with a third embodiment. The protective foot 10 has a bottom plate 1 and side portions 8. In this case, the side portions 8 are not prestressed as in the first and second embodiments. Provided on the side portions 8 are movable jaws 5 which can be respectively pressed against the item 100 or against the first end 110 thereof in accordance with the principle of a vise by way of an adjusting screw 6. The protective foot 1 can be released from the item 100 by simply releasing the jaws 5.

Optionally a first anti-slip unit (e.g., anti-slip mat) can be provided on the underside of the bottom plate 1. In addition, optionally a second anti-slip unit (e.g., anti-slip mat) can be provided on a top side of the bottom plate 1.

Figure 4:
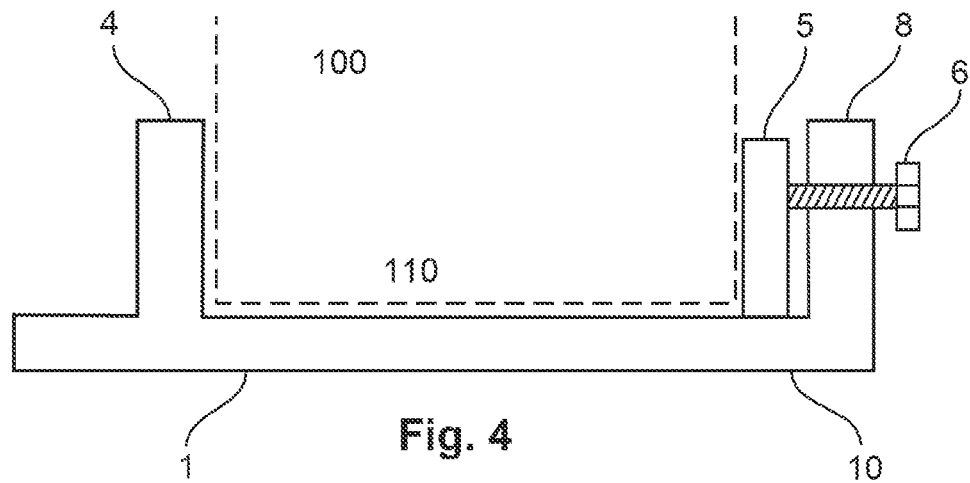
FIG. 4 shows a diagrammatic sectional view of a protective foot according to a fourth embodiment.

FIG. 4 shows a diagrammatic sectional view of a protective foot according to a fourth embodiment. In this case, the protective foot 10 has a bottom plate 1 and first and second side portions 4, 8. The first and second side portions 4, 8 are preferably not provided in a prestressed condition (as in the first and second embodiments). Provided on the first side portion can be movable jaws 5 which can be pressed against the item 100 on the basis of the principle of a vise by way of an adjusting screw 6. The second side portion 4 preferably does not have a stressing device so that the protective foot is fixed to a lower end of the item 100 by way of the jaws 5 and the adjusting screw 6. The side portions 4, 8 can serve to receive stopper plates and to provide a safeguard against horizontal movement.

Optionally a first anti-slip unit (e.g., anti-slip mat) can be provided on the underside of the bottom plate 1. In addition, optionally a second anti-slip unit (e.g., anti-slip mat) can be provided on a top side of the bottom plate 1.

Figure 5:
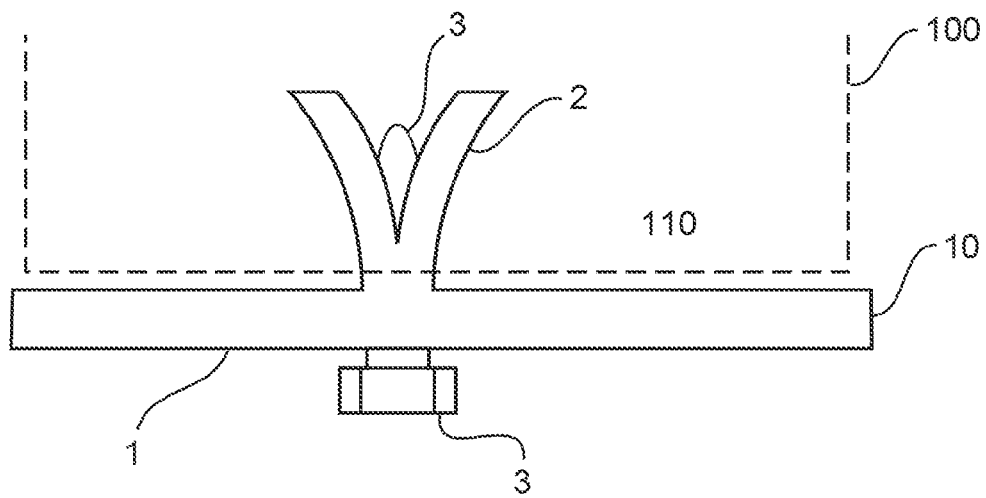
FIG. 5 shows a diagrammatic view of a protective foot according to a fifth embodiment.

FIG. 5 shows a diagrammatic view of a protective foot 10 according to a fifth embodiment. In this case, the protective foot 10 has a bottom plate 1 and a fixing unit 2, 3 for fixing the protective foot 10 to the piece goods item 100. The fixing unit has a spreading unit 2 and a screw 3 which can be used on the basis of the principle of a dowel pin, that is to say when the screw 3 is screwed into the spreading unit 2 the spreading unit 2 will increase in width so that the fixing unit can be fixed in a hole in the item 100. Therefore, the protective foot 10 can be fixed to the item 100 by tightening the screw 3. The fifth embodiment is particularly advantageous in relation to piece goods items 100, the side surfaces of which do not extend at a right angle from the base surface.

Optionally a first anti-slip unit (e.g., anti-slip mat) can be provided on the underside of the bottom plate 1. In addition, optionally a second anti-slip unit (e.g., anti-slip mat) can be provided on a top side of the bottom plate 1.

Figure 6:
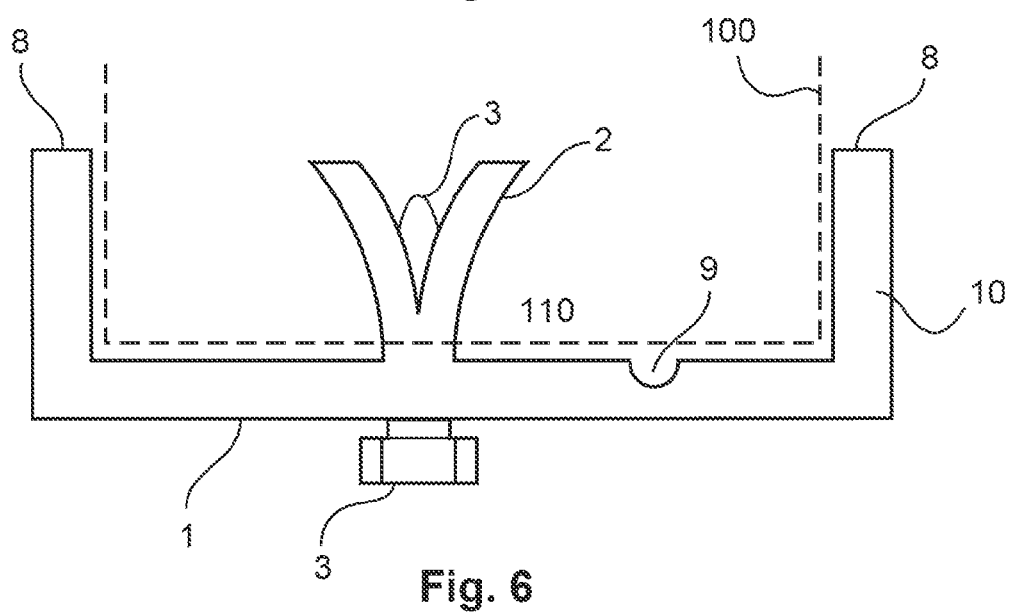
FIG. 6 shows a diagrammatic sectional view of a protective foot according to a sixth embodiment.

FIG. 6 shows a diagrammatic sectional view of a protective foot 10 according to a sixth embodiment. The protective foot 10 has a bottom plate 1 and side walls 8. The protective foot 10 further has a fixing unit 2, 3 and optionally a drainage channel 9. The fixing unit 2, 3 of the sixth embodiment corresponds in this respect to the fixing unit of the fifth embodiment. The drainage channel 9 can be provided at the top side of the bottom plate 1 and serves for the protective foot 10. Water that is in the protective foot 10 can flow away through the drainage channel 9. That can prevent water or moisture accumulating and being able to expand when frost occurs and leading to damage to the item 100.

Optionally a first anti-slip unit (e.g., anti-slip mat) can be provided on the underside of the bottom plate 1. In addition, optionally a second anti-slip unit (e.g., anti-slip mat) can be provided on a top side of the bottom plate 1.

Figure 7:
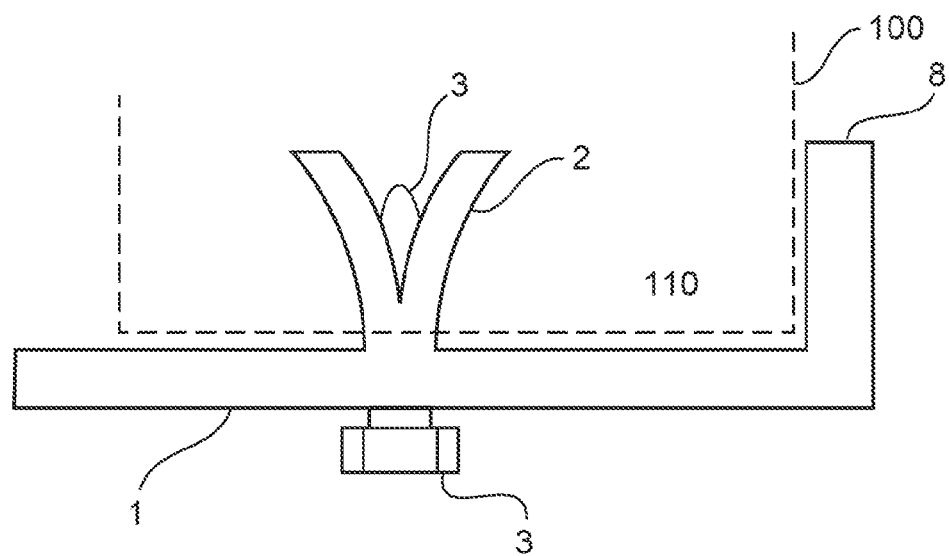
FIG. 7 shows a diagrammatic sectional view of a protective foot according to a seventh embodiment.

FIG. 7 shows a diagrammatic sectional view of a protective foot 10 according to seventh embodiment. In the case, the protective foot 10 has a bottom plate 1 and a side wall 8 and a fixing unit 2, 3. In this case, the fixing unit 2, 3 in the seventh embodiment substantially corresponds to the fixing unit of the fifth or sixth embodiment. In this case, the fixing unit 2,3 is provided in the bottom plate 1.

Figure 8:
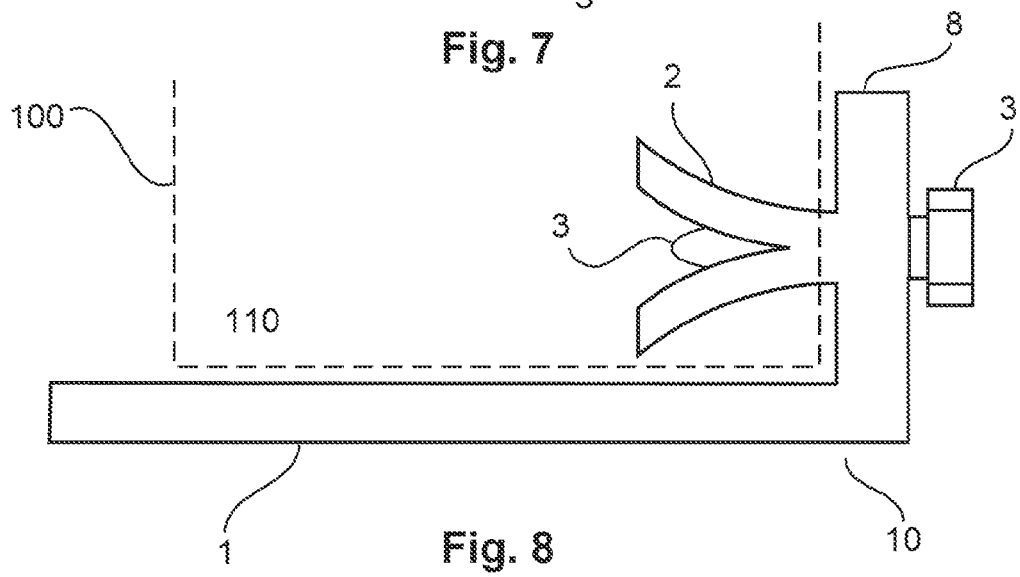
FIG. 8 shows a diagrammatic sectional view of a protective foot according to a eighth embodiment.

FIG. 8 shows a diagrammatic sectional view of a protective foot 10 according to the eighth embodiment. In this case, the protective foot 10 has a bottom plate 1 and a side portion 8. In this case, a fixing unit 2, 3 can be provided in the side portion 8. The fixing unit 2,3 of the eighth embodiment can in this case correspond to the fixing unit of the fifth, sixth or seventh embodiment.

To provide lateral protection for piece goods items 100, the foot 10 of FIG. 6 can have side walls 8 which at the same time can serve to receive stopper plates, as are used in ship transport situations. FIG. 6 also shows a drainage channel 9, which provides that no moisture accumulates, which, for example, can cause considerable damage to the item 100 by expansion in the event of frost.

The item 100 can be a pylon section segment and can be in the form of a precast concrete pylon portion or concrete pylon segment, in particular for a pylon of a wind power installation.

In a further embodiment of the invention, the bottom plate 1 and/or the side portions 8 are of a thickness of about 4-5 cm.

Optionally a first anti-slip unit (e.g., anti-slip mat) can be provided on the underside of the bottom plate 1. In addition, optionally a second anti-slip unit (e.g., anti-slip mat) can be provided on a top side of the bottom plate 1.

Figure 9:
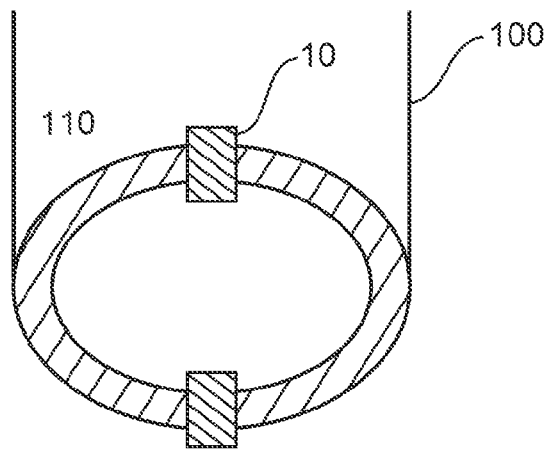
FIG. 9 shows a diagrammatic view of a protective foot according to a ninth embodiment.

FIG. 9 shows a diagrammatic view of a piece goods item 100 and a protective foot 10 according to a ninth embodiment. The protective foot 10 of the ninth embodiment can be based on one of the preceding embodiments or a combination of the preceding embodiments.

In a further embodiment of the invention, the fixing units 2, 3 (e.g., spreading unit) can be fixed in holes at the end of the item 100 in the form of a pylon section. That can provide for easy handling upon fitting and removal both in a factory and also at the building site. A first end 110 of a piece goods item 100 or a concrete pylon segment or a pylon section segment or a pylon section can be protected from chipping off when being set down or being transported, by the bottom plate 1.

Optionally a first anti-slip unit (e.g., anti-slip mat) can be provided on the underside of the bottom plate 1. In addition, optionally a second anti-slip unit (e.g., anti-slip mat) can be provided on a top side of the bottom plate 1.

Moreover, the various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A protective foot for a concrete pylon segment of a wind power installation pylon, the concrete pylon segment having an end with at least one hole, the protective foot comprising:
    a bottom plate;
    a first and a second side portion coupled to the bottom plate forming a U-shape, the first and second side portions and the bottom plate configured to partially enclose the end of the concrete pylon segment; and
    a spreading unit arranged on at least one of the bottom plate, the first side portion, and the second side portion and configured to be placed into the at least one hole of the concrete pylon segment and to releasably fix the protective foot to the end of the concrete pylon segment, the spreading unit including a screw that causes the spreading unit to flex outward when the screw is rotated thereby fixing the spreading unit to the end of the concrete pylon segment.

2. A protective foot according to claim 1 wherein the spreading unit is in the form of jaws having an adjusting screw and is adapted to clamp the end of the pylon segment in place.

3. A protective foot according to claim 1 wherein at least one of the bottom plate and the at least one side portion has a base material of polyurethane.

4. A protective foot according to claim 1 and further comprising an anti-slip unit on at least one of an underside of the bottom plate and a part of a top side of the bottom plate.

5. A pylon section segment of a wind power installation having at least one protective foot according to claim 1 attached thereto.

6. A method of transporting a concrete pylon segment of a wind power installation pylon, the method comprising:
    arranging a U-shaped protective foot having a bottom plate and first and second side portions over an end of the concrete pylon segment;
    placing an end of a spreading unit into an opening of the concrete pylon section segment of a wind power installation tower; and
    removeably securing the spreading unit to the pylon section segment by rotating a screw of the spreading unit to cause the spreading unit to move outward and press against an inner surface of the pylon section segment.

7. The method according to claim 6 further comprising performing the method before transporting the pylon section segment of the wind power installation.

8. The method according to claim 7 further comprising coupling the pylon section segment to another pylon section segment to form a portion of a pylon.

9. The method according to claim 7 further comprising removing the spreading unit by rotating the screw to cause the spreading unit to move away from the inner surface of the opening of the pylon section segment.

10. A system comprising:
    a concrete pylon segment of a wind power installation having a bottom surface and at least one opening in the bottom surface; and
    a U-shaped protective foot that includes a bottom plate, first and second side portions, and a spreading unit coupled to the bottom plate, the spreading unit located in the opening in the bottom surface of the pylon segment and removeably secured to the pylon segment, the spreading unit being configured to flex outward when the screw is rotated in a first direction for securing the protective foot to the pylon segment and configured to retract inward when the screw is rotated in a second direction for removing the protective foot from the pylon segment.

11. The system according to claim 10 wherein the spreading unit applies pressure to an inner surface of the pylon segment in the opening.

* * * * *